UNITED STATES PATENT OFFICE 2,574,829

PREPARATION OF ORGANIC SULFENYL XANTHATES, SULFENYL TRITHIOCARBONATES, THIOSULFENYL XANTHATES AND THIOSULFENYL TRITHIOCARBONATES

Chester M. Himel and Lee O. Edmonds, Bartlesville, Okla., assignors to Phillips Petroleum Company, a corporation of Delaware No Drawing. Application December 31, 1948, Serial No. 68,737

14 Claims. (Cl. 260—455)

This invention relates to the preparation of organic sulfur compounds of the general formula

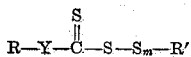

wherein R and R' are organic radicals from the class of alkyl, aryl, alkaryl and aralkyl groups; Y is a member of the class consisting of oxygen and sulfur; and m is an integer from the group of 1 and 2. The invention also relates to novel compounds represented by the above formula wherein R, R' and Y have the above designations and wherein m is 2 when Y is oxygen and m is one of the integers from the group of 1 and 2 when Y is sulfur. More particularly the compounds may be described as organic sulfur derivatives of compounds from the class of xanthates and thioxanthates or, in other words, sulfenyl or thiosulfenyl xanthates and sulfenyl or thiosulfenyl thioxanthates. A more common term for the designation of the thioxanthate compounds has been trithiocarbonates.

Thus the compounds of the present invention include compounds represented by ROC(S)SSR', RSC(S)SSR', ROC(S)SSSR' and RSC(S)SSSR' and designated as sulfenyl xanthates, sulfenyl thioxanthates or trithiocarbonates, thiosulfenyl xanthates, and thiosulfenyl thioxanthates or trithiocarbonates, respectively. These compounds are useful as accelerators of vulcanization, polymerization modifiers, ore flotation agents, intermediates in the production of useful thiosulfenyl- and sulfenyl-containing organic chemicals, and additives for elastomers. One class of materials which is prepared in the present process and is represented by the above formula is particularly efficacious as ignition promoters for diesel fuels as shown in the patent to Cloud et al., U. S. 2,268,382 issued December 30, 1941. The compounds from the present class all possess the dithiocarboxylic acid group, —C(:S)S—, which makes them especially suitable as additive agents where organic sulfur-containing compounds are beneficial.

According to our invention, the present organic sulfur compounds are prepared by reacting a metal xanthate or trithiocarbonate with an organic sulfur halide, such as a sulfenyl halide or a thiosulfenyl halide, with the elimination of a salt. The reaction may be represented as follows:

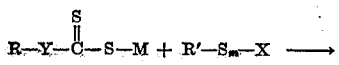

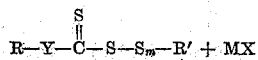

wherein M represents a metallic element; X denotes a halogen selected from group consisting of chlorine, bromine, and iodine; and wherein R, R', Y, and m represent the same constituents as applied in the formula above. The compounds formed when Y is oxygen and m is 2 and when Y is sulfur and m is 1 or 2 have never, to our knowledge, been prepared or reported in the literature, although they are valuable as sulfur-containing chemicals.

The reaction between the metal xanthate or trithiocarbonate and the sulfenyl or thiosulfenyl halide proceeds smoothly at substantially room temperature and atmospheric pressure. In some instances, particularly when employing xanthates and trithiocarbonates which are relatively unstable, lower temperatures may be preferred while higher temperatures may be employed with more stable reactants. In general, the operating temperatures lie between about —20° and 65° C., preferably 20° to 50° C. The reaction may be conveniently effected in the presence of a suitable inert solvent, such as a low-boiling paraffinic hydrocarbon or mixture of hydrocarbons. It is especially advantageous to employ a solvent which boils at a relatively low temperature, at or near the particular reaction temperature desired, for example, between 20° and 50° C., so that the reaction may be conducted in a refluxing solvent. By so operating the reaction temperature may be maintained substantially constant and a degree of agitation is automatically provided. Such solvents include hydrocarbons such as the pentanes, isopentanes, hexanes and the like, and organic solvents such as diethyl ether, chloroform, and the like, which are inert with respect to the reactants and the reaction products. Preferably the organic sulfur halide is dissolved in the organic solvent and the resulting mixture is slowly added to an aqueous solution of a metal salt of the xanthic or thioxanthic acid. However, the particular order of mixing or the respective solvents for the reactants do not appear to be critical.

The product of reaction may be recovered from the solvent and by-products of reaction by distillation under reduced pressure. When employing an aqueous medium as one of the solvents and a low-boiling hydrocarbon liquid as the other, the reactant mixture can be allowed to stratify upon completion of the reaction into an aqueous phase and a separate hydrocarbon phase. The by-product metal halide salt is concentrated in the aqueous phase and the organic reaction product is concentrated in the hydrocarbon phase from which it may be recovered by distilling off the solvent. The product may be further purified by fractionation under reduced pressure to minimize decomposition of the product, if desired.

Atmospheric pressure is usually satisfactory but pressures slightly below or above atmospheric levels may be used if desired, while maintaining sufficient pressure to insure liquid phase at the reaction temperature. The reaction proceeds substantially to completion within about an hour and the reactants may be supplied to the reaction in substantially equal molecular proportions.

The xanthates and trithiocarbonates employed in this reaction may be obtained from any suitable source or may be prepared by the well-known interaction of an alcohol or thiol with carbon disulfide in the presence of an alkali metal hydroxide. Although various xanthates and thioxanthates may be employed in the present process, it has been found especially adaptable to those xanthates and thioxanthates derivable from alcohols and thiols having from one to four carbon atoms per molecule. The alkali metals have been found to be particularly suitable for the preparation of xanthates and trithiocarbonates, but other soluble metal salts such as those of the alkaline earths may be employed if desired. The preparation medium may be so arranged and the metal hydroxide so selected that the metal xanthate or thioxanthate will usually form as an insoluble crystalline compound which simplifies separation and recovery. In any case, recovery and purification of a metal xanthate salt prepared from an alcohol or thiol containing up to four carbon atoms to a molecule are readily effected by filtration if crystalline or by low pressure distillation if a stable liquid, while salts from higher alcohols and thiols may involve very high vacuum distillation, low temperature crystallization, solvent extraction or similar means of separation.

The sulfenyl halides or thiosulfenyl halides employed may be an alkyl, aryl, alkaryl, or aralkyl sulfur halide containing one or two sulfur atoms respectively, and may be prepared by the interaction of mercaptans or disulfides with elemental halogen at relatively low temperatures, preferably in the presence of organic solvents. Although it is generally preferred to prepare and employ the chlorides, the bromides and iodides may also be used as the sulfenyl or thiosulfenyl halide reactant.

The following examples illustrate particular modifications of the invention and illustrate suitable conditions for the preparation of the respective organic sulfur compounds. A number of the examples also disclose the novel compounds of the invention.

*Example 1*

Potassium ethyl xanthate was prepared by dissolving 1.1 mols of potassium hydroxide in three moles of ethyl alcohol, adding 1 liter of diethyl ether and subsequently 1 mol of carbon disulfide, the temperature being maintained at about 20° C. The precipitated white ethyl xanthate was removed on a filter, washed with ether and dissolved in 250 ml. of water. This aqueous solution was added dropwise to a stirred solution of 0.8 mol of tert-butylsulfenyl chloride in 1200 ml. of n-pentane at the temperature of refluxing pentane. When the addition was completed this mixture was stirred for one hour after which the aqueous layer was separated and discarded. The organic layer was washed with distilled water, dried over calcium chloride and fractionated under reduced pressure to provide a yield of 160 grams of light yellow-green O-ethyl-S-tert-butylsulfenyl xanthate, boiling point of 74–75° C. at 1 mm. Hg pressure and refractive index, $n_D^{20}$, of 1.559. Analysis of the product and comparative values based on the formula $C_7H_{14}OS_3$ are shown below:

|  | S | C | H |
| --- | --- | --- | --- |
| Calculated | 45.71 | 40.00 | 6.67 |
| Found | 44.98 | 40.03 | 6.81 |

The experiment was repeated using the same materials in substantially the same amounts. The procedure employed was as before except that the tert-butylsulfenyl chloride was added to the xanthate solution. The yield obtained was similar to that in the first experiment, thus demonstrating that either procedure is applicable.

*Example 2*

The experiment of Example 1 was repeated for the preparation of O-isopropyl-S-tert-butylsulfenyl xanthate. Five mols of isopropyl alcohol was placed in a reaction vessel and stirred with 1.1 mols of potassium hydroxide until the hydroxide was completely dissolved. When cool, one mol of carbon disulfide was added with stirring, after which 800 ml. of diethyl ether was stirred with the mixture. The crystalline isopropyl xanthate was removed on a filter, washed with ether, then dissolved in water and added dropwise to 1 mol of tert-butyl sulfenyl chloride in 1200 ml. of pentane. When the reaction was complete the pentane layer was removed, washed, dried and distilled.

A yield of 112 grams of O-isopropyl-S-tert-butylsulfenyl xanthate was isolated. The product was light yellow-green in color, had a boiling point of 94–97° C. at 1.8 mm. Hg and an index of refraction of 1.5468 measured at 20° C. $(n_D^{20})$.

*Example 3*

The experiment of Example 1 was repeated substituting tert-butylthiosulfenyl chloride for the reactant sulfenyl halide. A yield of 89 per cent of theoretical was obtained of a greenish-yellow, liquid O-ethyl-S-tert-butylthiosulfenyl xanthate having a refractive index $n_D^{20}$ of 1.5942.

*Example 4*

An experiment was conducted wherein equimolar amounts of tert-butyl mercaptan, sodium hydroxide, carbon disulfide, and tert-butyl sulfenyl chloride were commingled in a reactor fitted with reflux condenser in the following manner: Tert-butyl mercaptan was added slowly to ten molar aqueous sodium hydroxide at 30° C. The reaction mixture was then cooled to about 0° C. and the carbon disulfide added with stirring. The reaction mixture was then allowed to warm to room temperature and to this mixture was added an isopentane solution containing tert-butylsulfenyl chloride which had been prepared by introducing an equimolar amount of chlorine into a solution of di-tert-butyldisulfide in refluxing isopentane at about 30° C.

A crude yield of 89 per cent of theory of a reddish-colored S-tert-butyl-S'-tert-butylsulfenyl trithiocarbonate.

*Example 5*

An experiment was conducted wherein ethyl mercaptan, ten molar aqueous sodium hydroxide, carbon disulfide, and tert-butylsulfenyl chloride were commingled as in Example 4 with the exception that carbon disulfide addition was made at about 20° C. A yield of reddish-colored S-ethyl-S'-tert-butylsulfenyl trithiocarbonate of 79 per cent of theory was obtained which boiled at 114° C./2 mm. and had a refractive index of $n_D^{20}$ 1.6273.

*Example 6*

S-phenyl-S'-phenylsulfenyl trithiocarbonate is prepared by charging equimolar amounts of phenyl mercaptan, ten molar aqueous sodium hydroxide, and carbon disulfide to a reactor according to the procedure of Example 4. A chloroform solution of phenylsulfenyl chloride is then added with agitation to provide a high yield of S-phenyl-S'-phenyl-sulfenyl trithiocarbonate.

The chloroform solution of phenylsulfenyl chloride is prepared as follows: Chlorine is bubbled into chloroform at 45° C. until a substantially saturated solution results and phenyl mercaptan is then added with continued chlorine addition at a rate such that an excess of chlorine is maintained at all times. The yield of phenyl-sulfenyl chloride is substantially quantitative.

*Example 7*

S-ethyl-S'-phenylsulfenyl trithiocarbonate is prepared by charging equimolar amounts of ethyl mercaptan, ten molar aqueous sodium hydroxide, and carbon disulfide, to a reactor according to the procedure of Example 4. A solution of phenylsulfenyl chloride prepared according to the procedure described in Example 6 is then added with agitation. The product is isolated by removal of the solvent in vacuo.

*Example 8*

Sodium ethyltrithiocarbonate was prepared by slowly adding one mol of ethyl mercaptan to 110 ml. of 11 molar aqueous sodium hydroxide at room temperature. Four hundred milliliters of ether was added and the mixture cooled to about 20° C. and maintained at that level during the addition of one mol of carbon disulfide. After formation of the sodium ethyltrithiocarbonate was complete, 150 ml. water was added. The water and ether layers were then added to a reaction mixture of one mol of tertiary butylthiosulfenyl chloride in 1200 ml. isopentane. The product was washed, dried, and depentanized to provide S-ethyl-S'-tert-butylthiosulfenyl trithiocarbonate having a refractive index $n_D^{20}$ of 1.6318.

*Example 9*

Sodium tert-butyltrithiocarbonate was prepared by slowly adding one mol of tertiary butyl mercaptan to 310 ml. of three molar aqueous sodium hydroxide. The mixture was cooled to about 0° C. and one mol of carbon disulfide added with stirring. After formation of sodium tert-butyltrithiocarbonate was complete, 150 ml. water was added. The water and ether layers were then added to a reaction mixture of one mol of tertiary butylthiosulfenyl chloride in 1200 ml. isopentane. The product was washed, dried, and depentanized to proxide S-tert-butyl-S'-tert-butylthiosulfenyl trithiocarbonate.

Although the foregoing examples have been related particularly to the preparation of sulfenyl xanthates and thioxanthates and to the corresponding thiosulfenyl analogues from metal xanthates and thioxanthates derived from monohydric alcohols, the present process is equally applicable to the preparation of corresponding derivatives from polyhydroxy compounds such as the sugars, cellulose, polyhydric alcohols and the like, in which varying degrees of substitution are obtained by various reaction conditions, for example, of temperature and reaction time.

It may readily be recognized that numerous products containing various organic radicals may be produced by the present process, depending upon the constituent groups of the reactant compounds. Thus the constituents represented by R and R' in the formula may be the same or different organic radicals, although extent and rate of formation or the properties of resulting compounds are not necessarily equivalent in all respects.

Various modifications and changes in the process will be apparent to those skilled in the art and may be made without departing from the inherent scope of the present invention.

We claim:

1. A process for the preparation of an organic sulfur compound of the formula

where R and R' are organic radicals from the class consisting of alkyl, aryl, alkaryl, and aralkyl groups; Y is a member of the class consisting of oxygen and sulfur, and $m$ is an integer of the group consisting of 1 and 2, which comprises reacting an organic sulfur halide of the formula

where R' is an organic radical selected from the class consisting of alkyl, aryl, alkaryl, and aralkyl groups; X is a halogen selected from the group consisting of chlorine, bromine, and iodine, and $m$ is an integer selected from the group consisting of 1 and 2, with a metal salt selected from the class consisting of xanthates and trithiocarbonates, and forming a corresponding organic sulfur compound selected from the group consisting of sulfenyl xanthates, sulfenyl trithiocarbonates, thiosulfenyl xanthates and thiosulfenyl trithiocarbonates.

2. A process for the preparation of an organic sulfur compound of the formula

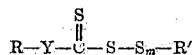

where R and R' are organic radicals from the class consisting of alkyl, aryl, alkaryl, and aralkyl groups; Y is a member of the class consisting of oxygen and sulfur, and $m$ is an integer of the group consisting of 1 and 2, which comprises contacting an organic sulfur halide of the formula R'—$S_m$—X where R' is an organic radical selected from the class consisting of alkyl, aryl, alkaryl, and aralkyl groups, X is a halogen selected from the group consisting of chlorine, bromine, and iodine, and $m$ is an integer selected from the group consisting of 1 and 2, with a metal salt selected from the group consisting of xanthates and trithiocarbonates in the presence of an inert organic solvent at a temperature between −20° and 65° C., and forming a corresponding organic sulfur compound selected from the group consisting of sulfenyl xanthates, sulfenyl trithiocarbonates, thiosulfenyl xanthates and thiosulfenyl trithiocarbonates.

3. A process for the preparation of an organic sulfur compound of the formula

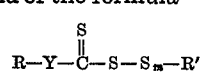

where R and R' are organic radicals from the class consisting of alkyl, aryl, alkaryl, and aralkyl groups, Y is a member of the class consisting of oxygen and sulfur, and $m$ is an integer of the group consisting of 1 and 2, which comprises contacting an aqueous solution of a metallic salt of an organic acid of the formula

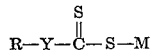

where R is an organic radical of the class consisting of alkyl, aryl, alkaryl, and aralkyl groups, Y is a member of the class consisting of sulfur and oxygen and M represents an alkali metal, with a hydrocarbon solution of organic sulfur halide of the formula

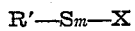

where R' is an organic radical selected from the class consisting of alkyl, aryl, alkaryl, and aralkyl groups, X is a halogen selected from the group consisting of chlorine, bromine, and iodine, and $m$ is an integer selected from the group consisting of 1 and 2; reacting said metallic salt with said organic sulfur halide and forming a corresponding organic sulfur compound selected from the group consisting of sulfenyl xanthates, sulfenyl trithiocarbonates, thiosulfenyl xanthates and thiosulfenyl trithiocarbonates; separating a resulting reaction mixture into an aqueous phase containing alkali metal halide salt and a hydrocarbon phase containing said corresponding organic sulfur compound, and recovering said corresponding organic sulfur compound from said hydrocarbon phase.

4. A process for the preparation of O-ethyl-S-tert-butylsulfenyl xanthate which comprises contacting an aqueous solution of potassium ethyl xanthate with tert-butylsulfenyl chloride in the presence of refluxing pentane, separating a resulting product into an organic phase and an aqueous phase, and recovering said O-ethyl-S-tert-butylsulfenyl xanthate from said organic phase.

5. A process for the preparation of O-isopropyl-S-tert-butylsulfenyl xanthate which comprises contacting an aqueous solution of isopropyl xanthate with tert-butylsulfenyl chloride in the presence of refluxing pentane, separating a resulting product into an aqueous phase and an organic phase, and recovering said O-isopropyl-S-tert-butylsulfenyl xanthate from said organic phase.

6. A process for the preparation of S,S'-di-tert-butylsulfenyl trithiocarbonate which comprises admixing an aqueous solution of sodium tert-butyl trithiocarbonate with an isopentane solution of tert-butylsulfenyl chloride at room temperature, separating a resulting product into an aqueous phase and a hydrocarbon phase, and recovering said S,S'-di-tert-butylsulfenyl trithiocarbonate from said hydrocarbon phase.

7. A process for the preparation of S-ethyl-S'-tert-butylthiosulfenyl trithiocarbonate which comprises admixing aqueous solution of sodium ethyltrithiocarbonate with an isopentane solution of tert-butylthiosulfenyl chloride, separating a resulting product into an aqueous phase and a hydrocarbon phase, and recovering said S-ethyl-S'-tert-butylthiosulfenyl trithiocarbonate from said hydrocarbon phase.

8. As a novel compound, S-ethyl-S'-tert-butylsulfenyl trithiocarbonate.

9. As a novel compound, S-ethyl-S'-tert-butylthiosulfenyl trithiocarbonate.

10. As a new composition of matter an organic xanthate characterized by a structural formula selected from the group consisting of

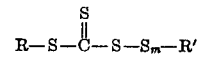

and

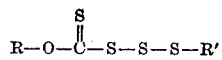

wherein R and R' are organic radicals from the class consisting of alkyl, aryl, alkaryl, and aralkyl, and $m$ is an integer of the group consisting of 1 and 2.

11. A process for the preparation of S-tert-butyl-S'-tert-butylthiosulfenyl trithiocarbonate which comprises admixing an aqueous solution of sodium-tert-butyl trithiocarbonate with an isopentane solution of tert-butylthiosulfenyl chloride at room temperature, separating the resulting reaction mixture into an aqueous phase and a hydrocarbon phase, and recovering said S-tert-butyl-S'-tert-butylthiosulfenyl trithiocarbonate from said hydrocarbon phase as a product of the process.

12. As a new composition, O-ethyl-S-tert-butylthiosulfenyl xanthate.

13. As a new composition, S-tert-butyl-S'-tert-butylsulfenyl trithiocarbonate.

14. As a new composition, S-tert-butyl-S'-tert-butylthiosulfenyl trithiocarbonate.

CHESTER M. HIMEL.
LEE O. EDMONDS.

REFERENCES CITED

The following references are of record in the file of this patent:

UNITED STATES PATENTS

| Number | Name | Date |
| --- | --- | --- |
| 1,819,112 | Perkins | Aug. 12, 1931 |